United States Patent
Andersson

[19]
[11] Patent Number: 5,900,092
[45] Date of Patent: May 4, 1999

[54] METHOD AND AN ARRANGEMENT FOR MANUFACTURING A WEB AND A WEB MANUFACTURED IN ACCORDANCE WITH SAID METHOD

[75] Inventor: Gösta Andersson, Stockholm, Sweden

[73] Assignee: Duni AB, Halmstad, Sweden

[21] Appl. No.: 08/894,888

[22] PCT Filed: Mar. 1, 1996

[86] PCT No.: PCT/SE96/00268

§ 371 Date: Oct. 14, 1997

§ 102(e) Date: Oct. 14, 1997

[87] PCT Pub. No.: WO96/26879

PCT Pub. Date: Sep. 6, 1996

[30] Foreign Application Priority Data

Mar. 2, 1995 [SE] Sweden ................................ 9500769

[51] Int. Cl.⁶ ........................................................ B65H 21/00
[52] U.S. Cl. .................... 156/201; 156/200; 156/227; 156/461; 156/544; 428/120
[58] Field of Search .................................... 156/199, 200, 156/201, 227, 459, 461, 544; 428/120

[56] References Cited

U.S. PATENT DOCUMENTS

| | | | |
|---|---|---|---|
| 4,050,972 | 9/1977 | Cardinal, Jr. ............................ | 156/71 |
| 4,088,527 | 5/1978 | Murase et al. ........................... | 156/502 |
| 4,931,126 | 6/1990 | McCarville et al. ................... | 156/304.6 |
| 5,460,672 | 10/1995 | Mallonee ................................ | 156/73.4 |

FOREIGN PATENT DOCUMENTS

| | | |
|---|---|---|
| 0045819 | 2/1982 | European Pat. Off. . |
| 2671706 | 7/1992 | France . |
| 436347 | 12/1984 | Sweden . |

*Primary Examiner*—James Sells
*Attorney, Agent, or Firm*—Ostrolenk, Faber, Gerb & Soffen, LLP

[57] ABSTRACT

The invention relates to a method and apparatus for producing a material web of synthetic textile material for conversion into table-cloths. Here, two material webs produced according to standard procedure are joined along their respective side edges to a material web folded to a V shape for obtaining a total width on the produced web that is greater than the maximum width of a web produced by standard procedure. The inventive apparatus includes two reels (1, 2) on which are would webs (3, 4) of standard manufacture, which may be rolled off the reels and into mutual proximity with the aid of a roll nip (6) disposed after the reels, there also being a folding plate (8) for folding a third web (5) into a V shape which may be joined to both webs (3, 4) along their respective juxtaposed side edges by its free side portions (12, 13) to form a material web (11) having a total width which is greater than the maximum width of a web produced by standard procedure. A web (11) produced in accordance with the method and apparatus includes at least three webs (3, 4, 5) spliced to each other along their respective side edges, at least one web (5) having its free side portion (12, 13) overlapping and joined to the longitudinal edges (9, 10) of the juxtaposed webs (3, 4).

7 Claims, 1 Drawing Sheet

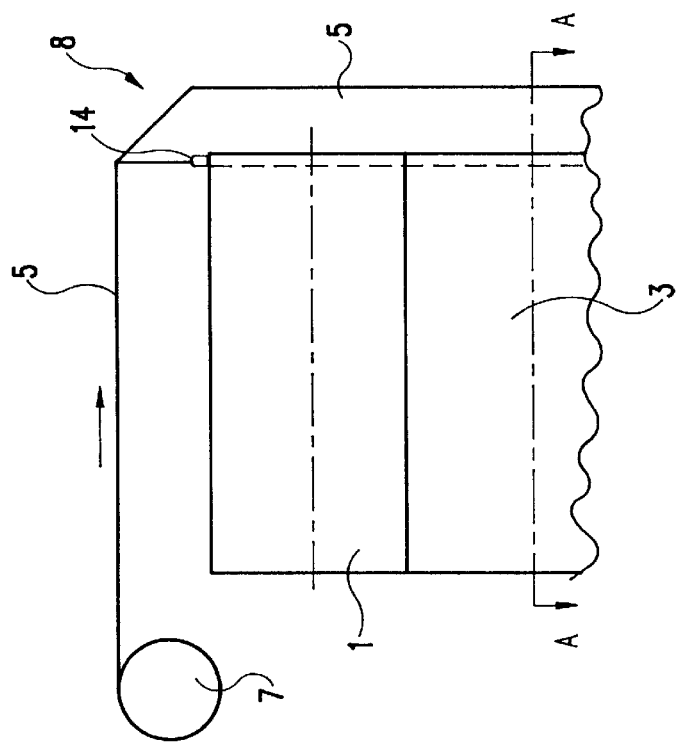
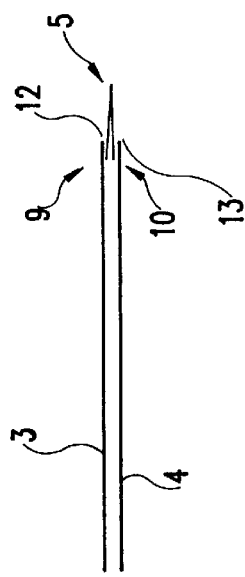
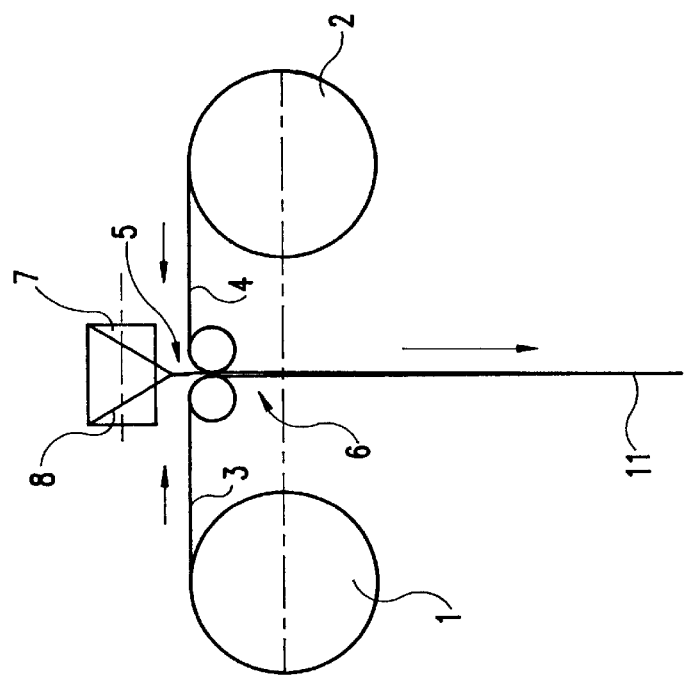

METHOD AND AN ARRANGEMENT FOR MANUFACTURING A WEB AND A WEB MANUFACTURED IN ACCORDANCE WITH SAID METHOD

BACKGROUND OF THE INVENTION

The present invention relates to a method and an apparatus for producing a web of synthetic textile material for making up into table-cloths, and also such a web manufactured according to the method using the apparatus.

The market today for cloths made from disposable material having extra large widths is considerably less than for corresponding cloths of normal width. Investment and production costs will be very high for producing extra wide cloths if presently available techniques were used for multi-colour styles and printed decorations. A theoretically possible solution to producing such cloth with different colours and print over its width would be to splice two webs, although acceptance by customers would probably be low.

SUMMARY OF THE INVENTION

The object of the present invention is to solve the problems mentioned, and achieve a method and an apparatus for producing an extra wide material web, as well as one manufactured according to the method, which by longitudinal splicing of at least three material webs provides a web having a total width complying with the desired, extra wide configuration. The invention relates to a method and an apparatus for producing a material web of synthetic textile material for conversion into table-cloths. Here, two material webs produced according to standard procedure are overlaid and joined along their respective side edges to the sides or the legs of the V of a material web folded to a V shape, for obtaining a total width of the produced web that is greater than the maximum width of a web produced by standard procedure. The inventive apparatus includes two reels on which are wound webs of standard manufacture, which may be rolled off the reels and into mutual proximity with the aid of a roll nip disposed after the reels. A folding plate folds a third web into a V shape, and the third web may be joined to both webs along their respective juxtaposed side edges by the free side less of the V to form a material web having a total width which is greater than the maximum width of a web produced by standard procedure. A web produced in accordance with the method and apparatus includes at least three webs spliced to each other along their respective side edges. At least one web is V-shaped and has its free side portions overlapping and joined to the longitudinal edges of the juxtaposed webs.

Due to the invention there is now enabled a material web of extra large width, using a method that is readily performed and which is cost-effective by utilizing webs of optional width in optional colours with or without decorative motives. In addition, there is provided in accordance with the invention equipment for producing a material web for the desired extra wide cloths.

The printed table runner, keeping together the two outer webs of the web produced in accordance with the invention, is traditionally used as a supplementary item loosely placed on top of an ordinary table-cloth. A method functioning technically well in accordance with the invention has been found, however, where this runner is made into an integrated part of the extra wide cloth in its delivery state, but for the observer of the laid table this arrangement can be appreciated as the table runner often placed loosely on top of an ordinary table-cloth for the sake of decoration. With the inventive method large amounts of material are gained, since there is no cloth which is otherwise, or usually, to be found under the runner.

Other advantageous properties of the web in accordance with the invention are that the central web in the form of a table runner with its superior print will be of very high quality, since printing takes place in separate, efficient machinery before splicing this web to the others, which have been dyed in a rational manner in standard equipment. The quality attainable in the final product in accordance with the invention by separately dyeing the different webs is not at all possible to achieve in one and the same machine at present. Several advantages are thus gained by having a central web that can be printed separately before it is integrated into the completed, extra wide web. Finally, in the production of the composite web in accordance with the invention very limited conversion waste is obtained.

BRIEF DESCRIPTION OF THE DRAWINGS

The invention will now be described in more detail below with the aid of a preferred embodiment example and with reference to the accompanying drawing, where FIG. 1 schematically illustrates an apparatus for producing a material web, in accordance with the invention, as seen in side elevation, FIG. 2 is a front elevation of the apparatus illustrated in FIG. 1, and FIG. 3 is a cross-section along the line A—A in FIG. 2.

DESCRIPTION OF A PREFERRED EMBODIMENT

As will be seen from the figures, an apparatus for producing a material web 11, in accordance with a preferred embodiment example of the invention, includes two reels 1 and 2 in spaced relationship. On these are wound webs 3 and 4, which may be rolled off towards each other and through a nip 6 situated between the reels. A third web 5, wound onto a reel 7, is fed into the nip 6 after having been folded into a V shape over a folding plate 8 situated above the nip 6. The web 5 passes into the nip with the free ends of its folded sides 12 and 13 between the edge 9 of web 3 and edge 10 of web 4, these two web edges being directly opposite each other. The sides 12 and 13 are caused to overlap the edges 9 and 10 and be joined to them for the purpose of forming the web 11, which will thus have a total width greater than that obtainable with standard procedure.

Before the web 5, which was folded into a V shape by the folding plate 8, is fed to the edge portions 9 and 10 of the webs 3 and 4 the free edge portions of its sides 12, 13 are provided with hot melt glue, or other adhesion agent via adhesion agent applicators 14. Before the edge cohesions of the webs 3, 4 and 5, the central web 5, in the illustrated example, is folded in such a way that possible pressure on it is directed inwardly. Both outside webs 3 and 4 are thus joined to the underside of the central web. After longitudinal splicing the composite material web 11 will look like a large cloth provided with a loose table runner.

The procedural method, which decides the implementation of the apparatus, provides a product, i.e. a material web. This web is converted into table-cloths having their upper sides folded inwards at their first longitudinal folding operation, and this affords advantages both in production and handling. Joining with adhesive takes place in a simple manner, and when the cloth is opened out on a table this is done so that the underside of the web comes against the table. The method of folding also ensures that any decoration on the upper side which could be degraded by scratching is protected by this side being folded inwards.

I claim:

1. A method of producing a material web of synthetic textile, comprising:

overlaying first and second webs of material;

folding a third web of material into a V shape;

applying the sides of the V of the third web to overlay side edges of the first and second webs such that the V of the third web projects beyond the side edges of the first and second webs for achieving a total width of the web that is greater than the maximum width of the web that would be produced by the first and second web overlaid.

2. The method of claim 1, wherein the sides of the V shaped third web are attached to the respective inward facing surfaces at the side edges of the first and second webs.

3. The method of claim 1, wherein prior to applying the third web to the first and second webs, orienting the first and second webs in mutual proximity with their respective side edges directly opposite each other before attaching the respective side edges of the first and second webs to the third web.

4. Apparatus for producing a material web of textile material from first and second webs of material overlaid and from a third web of material located at the side edges of the first and second webs, the apparatus comprising:

first and second web supplies spaced apart from each other, a first web suppliable from the first supply, a second web suppliable from the second supply;

rolls in the space between the first and second supplys defining a nip between them through which the first and second webs are moved for overlaying the first and second webs in mutual proximity;

a web folding plate disposed before the nip along the pathway such that a third web passing the plate then enters the nip between the first and second webs;

a third web supply and a third web suppliable from the third supply and passed over the folding plate, the folding plate being shaped for folding the third web passing thereover into a V shape along the length of the web wherein the V shape has sides joinable to the first and second webs, respectively;

the folding plate and the nip being so placed that the sides of the V engage the side edges of the first and second webs to form a material web comprising the first and second web the third web projecting beyond the side edges of the first and second webs for producing a greater total width web.

5. The apparatus of claim 4, wherein each of the first, second and third web supplies respectively comprises a reel on which the respective one of the first, second and third webs is wound and from which it is unwindable.

6. A material web of textile material comprising first and second material webs generally overlaid on each other and having respective overlaid side edges;

a third material web being folded in a V shape and having first and second sides respectively attached to the overlapping side edges of the first and second webs, the third web being so positioned with respect to the first and second webs that the folded V-part of the third web projects outward of the side edges of the first and second webs to produce a composite web wider than the first and second webs at the respective longitudinal side at which the third web is located.

7. The web of claim 6, wherein the sides of the V are attached at the side edges of the first and second webs on the facing opposed surfaces of the first and second webs.

* * * * *